US006944206B1

(12) United States Patent
Dent

(10) Patent No.: US 6,944,206 B1
(45) Date of Patent: Sep. 13, 2005

(54) RATE ONE CODING AND DECODING METHODS AND SYSTEMS

(75) Inventor: Paul W. Dent, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 921 days.

(21) Appl. No.: 09/718,022

(22) Filed: Nov. 20, 2000

(51) Int. Cl.[7] .............................................. H04B 1/707
(52) U.S. Cl. ....................... 375/144; 375/265; 375/341
(58) Field of Search ............................... 375/141, 144, 375/146, 147, 148, 262, 265, 341; 714/786, 714/794, 795

(56) References Cited

U.S. PATENT DOCUMENTS

| 4,462,101 | A | | 7/1984 | Yasuda et al. ................. 371/43 |
| 5,101,432 | A | | 3/1992 | Webb ........................... 380/33 |
| 5,197,061 | A | | 3/1993 | Halbert-Lassalle et al. ... 370/11 |
| 5,353,352 | A | | 10/1994 | Dent et al. ..................... 380/37 |
| 5,511,081 | A | | 4/1996 | Hagenauer .................... 371/43 |
| 5,729,559 | A | * | 3/1998 | Bright et al. ................. 714/786 |
| 5,748,650 | A | * | 5/1998 | Blaker et al. ................ 714/786 |
| 5,862,453 | A | * | 1/1999 | Love et al. .................... 455/69 |
| 6,188,717 | B1 | * | 2/2001 | Kaiser et al. ................ 375/148 |

FOREIGN PATENT DOCUMENTS

| EP | 0 673 131 | 9/1995 |
| EP | 1 056 250 | 11/2000 |
| WO | 98/32263 | 7/1998 |
| WO | 98/59423 | 12/1998 |
| WO | 02/01729 | 1/2002 |

OTHER PUBLICATIONS

Joachim Hagenauer, *Rate-Compatible Punctured Convolutional Codes (RCPC Code) and their Applications*, IEEE Transactions on Communications, vol. 36, No. 4, Apr., 1998.
Pierce and Karlin, *Reading Rates and the Information Rate of a Human Channel*, BSTJ 1956.
Wainright, *On the Potential Advantage of Smearing/Desmearing Filter Technique in Overcoming Impulse-Noise Problems in Data Systems*, Trans IRE on Communications Systems, Dec. 1961.
International Search Report for PCT/US01/29639.
Buch et al., "To compress or not to compress?", IEEE, 1996, pp. 189-203.
Martin E. Hellman, "Convolutional Source Encoding", IEEE Transactions in Information Theory, Nov. 1975, pps 651-656.

* cited by examiner

*Primary Examiner*—Don N. Vo
(74) *Attorney, Agent, or Firm*—Myers Bigel Sibley & Sajovec

(57) ABSTRACT

Methods and systems are provided for communicating encoded data. L received encoded signal values including soft information are received and transformed to L data symbols. In various embodiments, the L received encoded signal values are demodulated and the demodulated L received encoded signal values are convolutional decoded using a rate one convolutional decoder having only one output symbol per input symbol to provide the L data symbols, wherein the L received encoded signal values are convolutional encoded using a rate one convolutional encoder having only one output symbol per input symbol. In other embodiments of the present invention the L received encoded signal values are transformed using associated spectral energy at a plurality of frequency ranges within a bandwidth of a channel over which the L received encoded signal values are received for at least one of the L received encoded signal values.

34 Claims, 12 Drawing Sheets

RATE ONE CODING AND DECODING METHODS AND SYSTEMS

BACKGROUND OF THE INVENTION

The present invention relates to signal communications and, in particular, to reception and transmission of encoded and modulated signals over a communications channel.

One type of communications channel which is expanding particularly rapidly is wireless communications, particularly as more radio spectrum becomes available for commercial use and as cellular phones become more commonplace. In addition, analog wireless communications are gradually being supplemented and even replaced by digital communications. In digital voice communications, speech is typically represented by a series of bits which may be modulated and transmitted from a base station of a cellular communications network to a mobile terminal device such as a cellular phone. The phone may demodulate the received waveform to recover the bits, which are then converted back into speech. In addition to voice communications, there is also a growing demand for data services, such as e-mail and Internet access, which typically utilize digital communications.

There are many types of digital communications systems. Traditionally, frequency-division-multiple-access (FDMA) is used to divide the spectrum up into a plurality of radio channels corresponding to different carrier frequencies. These carriers may be further divided into time slots, generally referred to as time-division-multiple-access (TDMA), as is done, for example, in the digital advanced mobile phone service (D-AMPS) and the global system for mobile communication (GSM) standard digital cellular systems. Alternatively, if the radio channel is wide enough, multiple users can use the same channel using spread spectrum techniques and code-division-multiple-access (CDMA).

A typical digital communications system 19 is shown in FIG. 1. Digital symbols are provided to the transmitter 20, which maps the symbols into a representation appropriate for the transmission medium or channel (e.g. radio channel) and couples the signal to the transmission medium via antenna 22. The transmitted signal passes through the channel 24 and is received at the antenna 26. The received signal is passed to the receiver 28. The receiver 28 includes a radio processor 30, a baseband signal processor 32, and a post processing unit 34.

The radio processor typically tunes to the desired band and desired carrier frequency, then amplifies, mixes, and filters the signal to a baseband. At some point the signal may be sampled and quantized, ultimately providing a sequence of baseband received samples. As the original radio signal generally has in-phase (I) and quadrature (Q) components, the baseband samples typically have I and Q components, giving rise to complex, baseband samples.

The baseband processor 32 may be used to detect the digital symbols that were transmitted. It may produce soft information as well, which gives information regarding the likelihood of the detected symbol values. The post processing unit 34 typically performs functions that depend on the particular communications application. For example, it may convert digital symbols into speech using a speech decoder.

A typical transmitter is shown in FIG. 2A. Information bits, which may represent speech, images, video, text, or other content material, are provided to forward-error-correction (FEC) encoder 40, which encodes some or all of the information bits using, for example, a convolutional encoder. Such error correction codes are generally designed to generate a number of bits for transmission greater than the underlying number of information bits, in order to obtain redundancy and, thus, increase the reliability of transmission. The ratio of the underlying data bit content to the number of transmitted bits is called the 'rate' of the code. The lower the rate, the more error protection is obtained. The error protection is, however, generally only obtained at the expense of an increase in the bandwidth. It is a fundamental law of Shannon that an increase in bandwidth is necessary to increase the reliability of transmission of data over channels corrupted by stationary, white Gaussian noise.

The FEC encoder 40 produces coded bits, which are provided to an interleaver 42, which reorders the bits to provide interleaved bits. These interleaved bits are provided to a modulator 44, which applies an appropriate modulation for transmission. The interleaver 42 may perform any type of interleaving. One example is block interleaving.

The modulator 44 may apply any of a variety of modulations. Higher-order modulations are frequently utilized. One example is 8-PSK (eight phase shift keying), in which 3 bits are sent using one of 8 constellation points in the in-phase (I)/quadrature (Q) (or complex) plane. In 8-PSK with Gray coding adjacent symbols differ by only one bit. Another example is 16-QAM (sixteen quadrature amplitude modulation), in which 4 bits are sent at the same time. Higher-order modulation may be used with conventional, narrowband transmission as well as with spread-spectrum transmission.

FIG. 2B further illustrates the stages in coding an information signal for transmission. Information may originate in many forms, such as an analog speech signal from a microphone, detected key depressions on a keyboard representing text, or video signals from a camera representing images. The first step, known as source coding (block 50) includes converting the information to a sequence of binary bits, which is often the preferred form in today's technology. The source coding (block 50) can use simply an analog-to-digital converter, or may comprise data compression to various degrees of sophistication. Data compression, however, may have the effect of raising the average amount of information carried by every bit, i.e., of raising the importance of each bit, thereby increasing the sensitivity to bit errors. This is typically only done when it is believed that the protection that can be added by intelligent error correction and detection coding (block 52) as greater than afforded by the natural redundancy in the information source. Thus, source coding (block 50) and channel coding (block 52) can be considered contradictory operations, the former aiming to remove natural redundancy from the information source, thereby reducing the number of bits to be transmitted, while the latter re-inserts redundancy, thereby increasing the number of bits to be transmitted.

It is known (see "On the Information Processing Capacity of the Human Channel," Pierce and Karlin, BSTJ 1957) that human information sources, such as speech and text typically only have an information content of around 30–60 bits per second, but practical source coders have generally not yet come close to achieving that degree of compression.

After channel coding (block 52) the steps of modulating the coded information on to a radio frequency carrier for transmission using modulator (block 57) can include packing multiple binary bits into a multi-bit symbol, such as QPSK, 8-PSK, 16QAM etc. (block 54); assigning each multi-bit symbol to a signal constellation point, which may be an analog voltage level in one dimension (e.g., Multi-level amplitude modulation or M-AM) or assigning the symbol to a point in the complex lane, i.e., to a complex number, as in the case of M-QAM or M-PSK (block 56); filtering the sequence of signal constellation points to produce a bandwidth-restricted, continuous-time waveform (block 58); and unconverting the continuous-time waveform to a desired radio carrier frequency (block 59).

A receiver for receiving and decoding the signal transmitted in accordance with FIG. 2B may include the inverse functions, namely: 1) receiving and downconverting the radio signal to produce complex number measurements representing the constellation points; 2) converting the complex numbers to "soft" symbol and then bit values, representing the degrees of "oneness" or "zeroness," i.e., the likelihood that a bit is '1' or '0.' It is known that the likelihood of a '1' or '0' can be conveniently represented on a scale of log-likelihood ratio, which may simplify error correction decoding; 3) error correction decoding, which involves determining the source bit sequence that best explains the received soft bit values, i.e., which predicts the soft-bit sequence giving the highest cumulative likelihood; and 4) source decoding, which converts the decoded bits back to the original information form, e.g., speech or text.

The well-known Viterbi convolutional decoder may be used to decode convolutional error-correction codes by sequentially determining the information bit sequence that predicts the received signal with the highest cumulative likelihood. Recently, methods to exploit the remaining redundancy in the source coded bits when Viterbi-decoding a coded signal have been proposed, and named "source-controlled decoding." The principle of source-controlled decoding is generally to have first determined the "entropy" of the information source, in terms of the probability that a '1' or '0' respectively will occur at a particular position in the source coder output bitstream, given that it is preceded by each particular pattern of a limited history of bits. If the limited bit history on which the next bit probability depends is chosen to correspond to the constraint length of a convolutional channel coding (block 50), for example, then the convolutional decoder can weight each candidate decoded sequence with these a-priori probabilities as well as the likelihoods derived from received soft information, to thereby possibly exclude errors that would have produced an unlikely source signal. As a simple example, suppose a single doubtful coded bit in a coded text string could, on the one hand, have resulted in the sequence of characters "strz . . . " being decoded, or alternatively "stri . . . ". Since the former is a very unusual sequence to appear in plain text, its cumulative likelihood metric would be weighted lower than that for the latter. Ultimately, the Viterbi decoder outputs the sequence which has the highest product of the cumulative likelihood that the sequence matches received soft bits times the probability with which the decoded character string appears in plain text.

A conventional baseband processor is shown in FIG. 3. A baseband received signal is provided to the demodulator and soft information generator 60 which produces soft bit values. These soft bit values are provided to the soft information de-interleaver 62 which reorders the soft bit values to provide de-interleaved soft bits. These de-interleaved soft bits are provided to the FEC decoder 64 which performs, for example, convolutional decoding or block decoding, to produce detected information bits.

A typical conventional convolutional coder (as described above) is conceptually a shift register through which data to be encoded is shifted. Different combinations of delayed data bits are extracted from taps on the shift register and, for example, XORed, to produce two or more parity bits. The number of parity bits produced per new data bit shifted in sets the rate of the code. FIG. 4 illustrates a rate ⅓rd coder that produces three parity bits out for every new input bit. Conventionally, all these bits are transmitted and decoded at the receiver to determine the original data bits by means of a Viterbi sequential maximum likelihood estimator (MLSE) machine.

A variation on this is the known prior art Punctured Convolutional Coding, in which not all parity bits are transmitted but different parity bits at different times are deleted to reduce the overall bitrate transmitted over the channel, giving a different compromise between bandwidth expansion and error protection. The punctured convolutional coding technique may be suitable for providing different levels of error protection to different data bits in the message, as more or less of the parities can be deleted as particular data bits pass through the encoder according to the level of protection needed. For example, the most significant bits of an 8-bit Pulse Code Modulated (PCM) speech sample can be given highest protection by not deleting any parities while they are being encoded, while the least significant bits are given least protection by deleting all parities except one while they are encoded. In general, the latter occurs interleaved with coding of different rates so that a mixed pattern of deletions is used, known to both the transmitter and receiver, that may be employed during the decoding process.

Channels such as mobile radio channels are typically characterized by non-Gaussian Rayleigh fading which may be multipath propagation. It is known to use error correction coding to add redundancy and to spread the coded bits out in time by means of interleaving. In the European GSM system, frequency hopping is typically employed in which signal bursts are transmitted on sequentially different, pseudo-randomly selected frequency channels, and the coded bits are spread over as many as eight different frequencies. The remaining errors after decoding are then typically less susceptible to the transmission quality being poor for an isolated bad burst.

Methods of recording digital data on magnetic tape or disc providing for error correction are also known. Magnetic media manufacture is generally imperfect and the medium is typically characterized by missing patches of magnetic material that cause short gaps in the recording. If these gaps are comparable to or larger than the span of a data bit on the medium, then one or more errors will typically result. It is known to pass the data to be recorded through an all-pass filter having deliberately large group delay distortion, with the result that each bit would be spread in time and additively overlapping with other time-spread bits. The waveform at each recording instant, therefore, should represent part of many bits instead of all of one bit, so that, if that sample was lost, a small part of many bits would be lost and not all of one bit, possibly avoiding an error. The playback amplifier may then contain an all-pass filter or equalizer having the inverse characteristic to that used on recording, thus collecting up the dispersed fractions of each data bit. Such a system is described in "On the Potential Advantage of Smearing/De-smearing Filter Technique in Overcoming Impulse-Noise Problems in Data Systems" by Wainright, Trans IRE on Communications Systems, December 1961. U.S. Pat. No. 5,101,432 to Webb. discusses varying the smearing and desmearing filter characteristics according to a crypto code in order to achieve secrecy.

SUMMARY OF THE INVENTION

In embodiments of the present invention, methods and systems are provided for communicating encoded data. L received encoded signal values including soft information are received and transformed to L data symbols. In various embodiments, the L received encoded signal values are demodulated and the demodulated L received encoded signal values are convolutional decoded using a rate one convolutional decoder having only one output symbol per input symbol to provide the L data symbols, wherein the L received encoded signal values are convolutional encoded using a rate one convolutional encoder having only one output symbol per input symbol. In other embodiments of the present invention the L received encoded signal values are transformed using associated spectral energy at a plurality of frequency ranges within a bandwidth of a channel over which the L received encoded signal values are received for at least one of the L received encoded signal values.

As will further be appreciated by those of skill in the art, the present invention may be embodied as methods, systems, wireless receivers, encoder/decoders and/or mobile terminals or base stations.

DETAILED DESCRIPTION OF THE INVENTION

Figure 1:
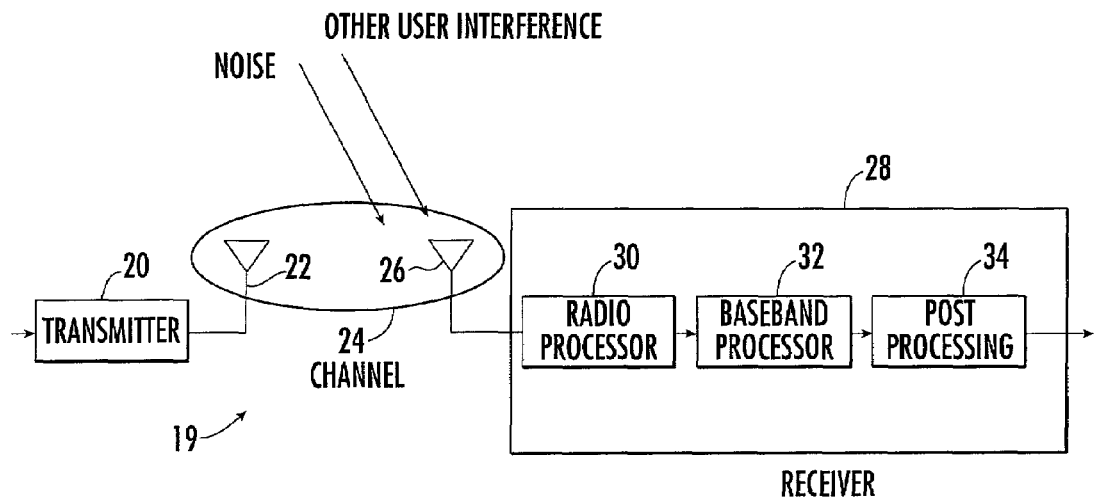
FIG. 1 is a block diagram illustrating a conventional communication system.
Figure 2A:
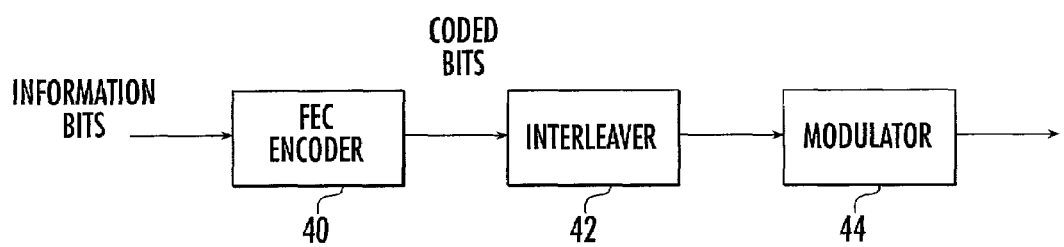
FIG. 2A is a block diagram illustrating a conventional transmitter.
Figure 2B:
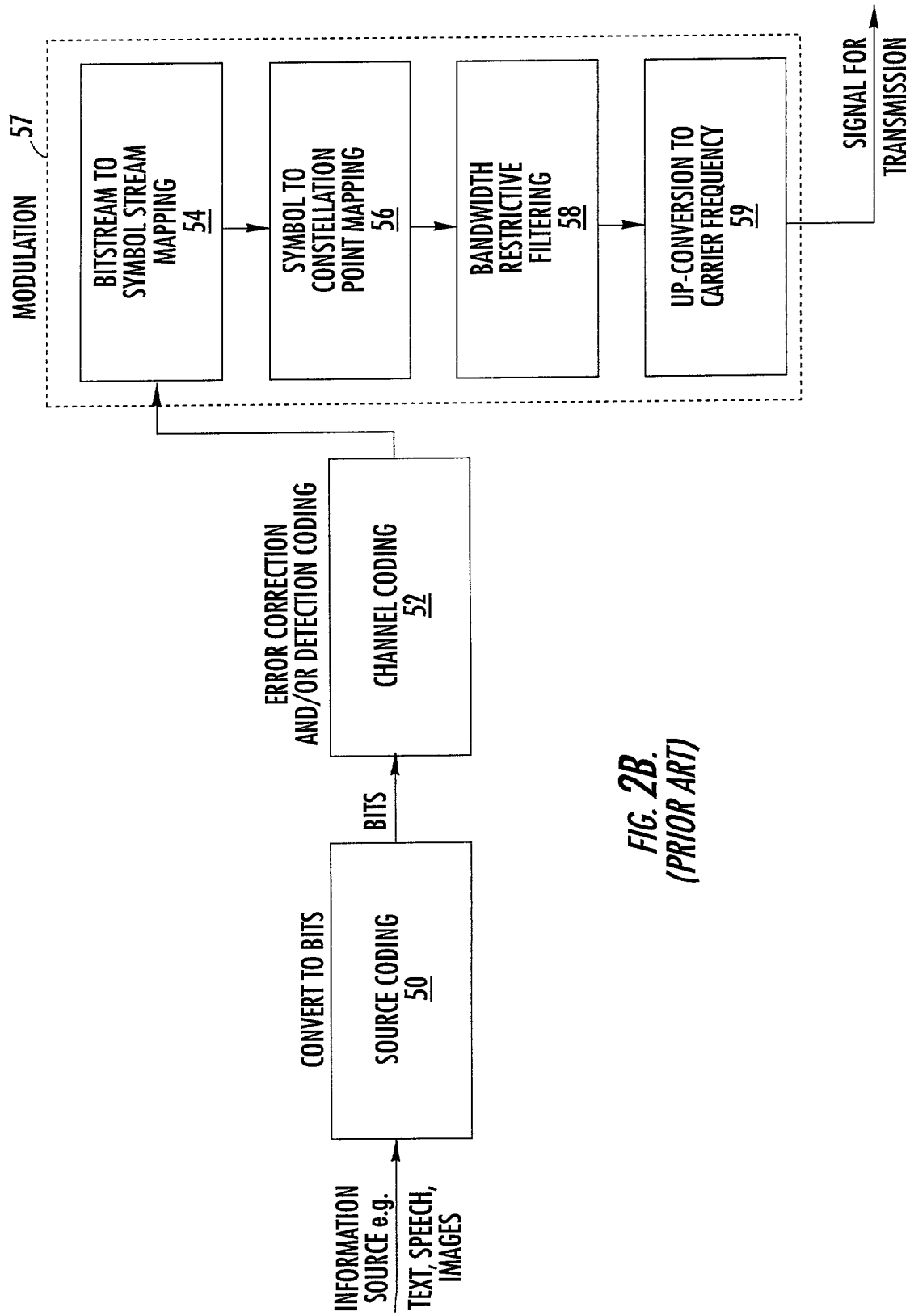
FIG. 2B is a block diagram illustrating conventional convolutional coding.
Figure 3:
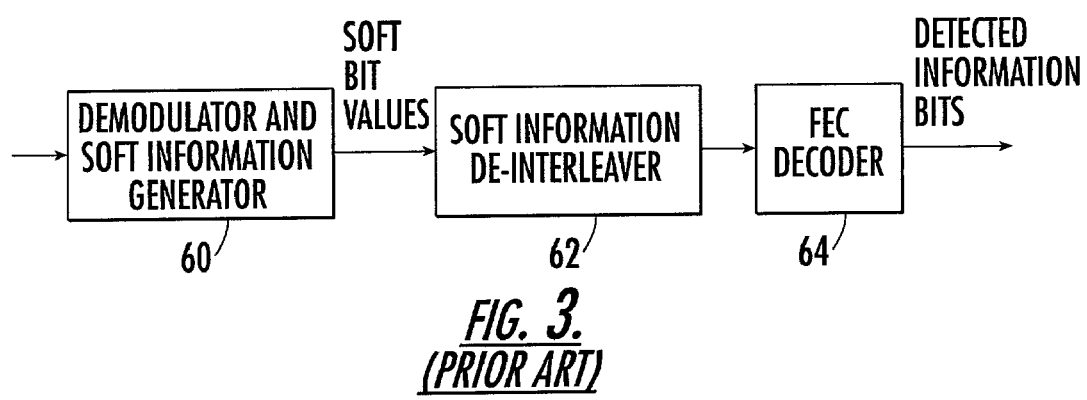
FIG. 3 is a block diagram illustrating a conventional baseband processor.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by those of skill in the art, the present invention may be embodied as methods or devices. Accordingly, the present invention may take the form of a hardware embodiment, a software embodiment or an embodiment combining software and hardware aspects.

The present invention will first be described with reference to the block diagram illustration of FIG. 5 which depicts a mobile terminal including an encoder/decoder in a wireless receiver according to embodiments of the present invention. It is to be understood that the encoder/decoder and wireless receivers of the present invention may be utilized in a variety of communication devices, including wireless communication devices such as wireless terminals including mobile terminals. Mobile terminals typically include a transmitter, a receiver, a user interface and an antenna system. The antenna system may include an antenna feed structure and one or more antennas. The antenna system may be coupled to the baseband processor through circuitry, such as an RF processor, configured to step up signals for transmission to an assigned transmission frequency or to step down received signals from a modulation frequency to a baseband frequency. However, the encoder/decoder in some applications may couple directly to the antenna systems, for example through integration into a demodulator, such as a Viterbi equalizer.

As is well known to those of skill in the art, the transmitter converts the information which is to be transmitted by the mobile terminal into an electromagnetic signal suitable for radio communications. The receiver demodulates electromagnetic signals which are received by the mobile terminal so as to provide the information contained in the signals to the user interface in a format which is understandable to the user. A wide variety of transmitters, receivers, and user interfaces (e.g., microphones, keypads, displays) which are suitable for use with handheld radiotelephones are known to those of skill in the art, and such devices may be implemented in a radiotelephone including a baseband processor in accordance with the present invention. It is further to be understood that the present invention is not limited to radiotelephones or other mobile terminals and may also be utilized with other wireless and wired communication receivers and further for communications with computer storage medium, such as magnetic storage devices, to extract data.

The present invention is generally described herein in the context of a wireless receiver and/or transmitter included in a wireless or mobile terminal and/or network communication base station. As used herein, the term "wireless terminal" or "mobile terminal" may include a cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Wireless or mobile terminals may also be referred to as "pervasive computing" devices.

In embodiments of the present invention, methods and systems are provided for communicating encoded data. L received encoded signal values including soft information are received and transformed to L data symbols (L being a number of signal values/symbols greater than 0). In various embodiments, the L received encoded signal values are demodulated and the demodulated L received encoded signal values are convolutional decoded using a rate one convolutional decoder having only one output symbol per input symbol to provide the L data symbols, wherein the L received encoded signal values are convolutional encoded using a rate one convolutional encoder having only one output symbol per input symbol. In other embodiments of the present invention, the L received encoded signal values are transformed using associated spectral energy at a plurality of frequency ranges within a bandwidth of a channel over which the L received encoded signal values are received for at least one of the L received encoded signal values.

In further embodiments of the present invention, the L received encoded signal values are orthogonal transform modulated and transforming the L received encoded signal values using associated spectral energy at a plurality of frequency ranges within a bandwidth of a channel over which the L received encoded signal values are received for at least one of the L received encoded signal values further includes orthogonal transform demodulating the L received encoded signal values to provide the L data symbols. Transforming operations may include transforming L source symbols using an orthogonal transform to provide L transmit encoded signal values. The L source symbols may be transformed as a block at the transmitter and the L encoded signal values may be transformed as a block at the receiver to provide the L data symbols. The L transmit encoded signal values are transmitted over a channel subject to non-Gaussian noise. In these embodiments, the L transmit encoded signal values are received over the channel as the L received encoded signal values and the L data symbols are estimates of the L source symbols. The estimates of the L source symbols may thereby be compensated for time-varying fading imperfections on the channel. The L source symbols may be L source bits and the L data symbols may be L data bits.

In other embodiments of the present invention, the L received encoded signal values are one of Fourier transform or inverse Fourier transform modulated and then deinterleaved at the receiver. In such embodiments, the L received encoded signal values are transformed using associated spectral energy at a plurality of frequency ranges within a bandwidth of a channel over which the L received encoded signal values are received for at least one of the L received encoded signal values based on the other of Fourier transform or inverse Fourier transform demodulating and de-interleaving the L received encoded signal values to provide the L data symbols. The L source symbols may be transformed as a block and the L received encoded signal values may be transformed as a block. The L data symbols may be complex symbols.

In further embodiments of the present invention, the L received encoded signal values are Walsh transformed, for example, scrambled Walsh transformed, at the transmitter and, at the receiver, the L received encoded signal values are Walsh transformed to provide the L data symbols. The L source symbols may be transformed as a block using a Walsh transform to provide L transmit encoded signal values and the L received encoded signal values may be transformed as a block at the receiver to L data symbols. The L data symbols may be complex symbols.

In various further embodiments of the present invention the L received encoded signal values are demodulated and the demodulated L received encoded signals are convolutional decoded as a block. The block may be received as a tail biting block. At the transmitter, the L source symbols in various embodiments are encoded (coded) using the rate one convolutional encoder having only one output symbol per input symbol to provide L transmit encoded signal values. The L transmit encoded signal values are transmitted over a channel subject to non-Guassian noise. The L data symbols generated at the receiver are then estimates of the L source symbols. In other embodiments, before transmitting, the L transmit encoded signal values are interleaved for transmission at non-sequential time intervals and the L received encoded signal values are de-interleaved at the receiver. In yet further embodiments, the interleaved L transmit encoded signal values are block coded prior to transmission and the L received encoded signal values are correspondingly block decoded at the receiver. The block decoding may be provided using a Reed-Solomon code, a Fire code, or a cyclical redundancy.

In various embodiments of the present invention, the soft information may be provided by a demodulator configured to output soft information. For example, the rate one convolutional decoder described in various embodiments above may demodulate the L received encoded signal values to output the soft information. In other embodiments, the soft information may be based on a measurement of the strength of respective ones of the L received encoded signal values.

In yet other embodiments of the present invention, methods are provided for communicating encoded data. L source data symbols are transformed to L encoded signal values. The L encoded signal values are transmitted in a form suited to producing associated soft information at a receiver. More particularly, transforming the L source data symbols to L encoded signal values further includes either convolutional coding the L source data symbols using a rate one convolutional coder having only one output symbol per input symbol to provide the L encoded signal values or transforming the L source data symbols as a block to L encoded signal values for transmission using associated spectral energy at a plurality of frequency ranges within a bandwidth of a channel over which the L encoded signal values are transmitted for at least one of the L encoded signal values. Transmitting the L encoded signal values in such embodiments includes transmitting the at least one of the L encoded signal values using associated spectral energy at the plurality of frequency ranges within the bandwidth of the channel over which the block of L encoded signal values are transmitted. The L source data symbols in various embodiments are transformed as a block to L encoded signal values using an orthogonal transform, a Walsh transform, a scrambled Walsh transform, or either a Fourier transform or an inverse Fourier transform followed by interleaving.

In further embodiments of the present invention, mobile terminals are provided including a portable housing. A receiver configured to receive L received encoded signal values including soft information over a channel, the channel having a bandwidth over which the L received encoded signal values are transmitted, is positioned in the housing. A transmitter configured to transmit encoded signal values is also positioned in the housing. An antenna is coupled to the receiver and the transmitter for transmitting the encoded signal values and receiving the L received encoded signal values over the channel. A transform circuit transforms the L received encoded signal values to L data symbols using associated spectral energy at a plurality of frequency ranges within the bandwidth of the channel over which the L received encoded signal values are received for at least one of the L received encoded signal values. The L received encoded signal values may be transformed at the reciever using associated spectral energy at substantially all frequencies within the bandwidth of the channel over which the L received encoded signal values are transmitted. Corresponding base stations are provided in yet further embodiments of the present invention.

Figure 4:
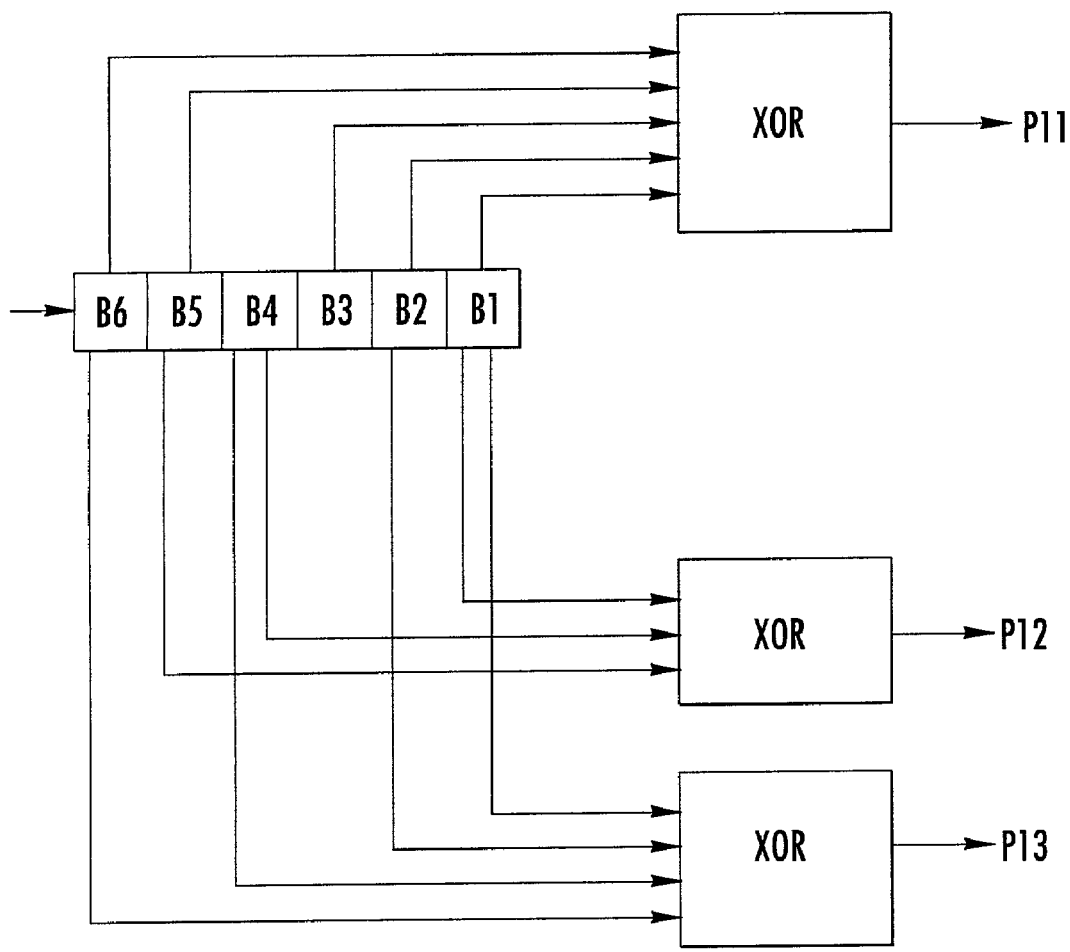
FIG. 4 is a block diagram illustrating a conventional rate ⅓ convolutional coder.
Figure 5:
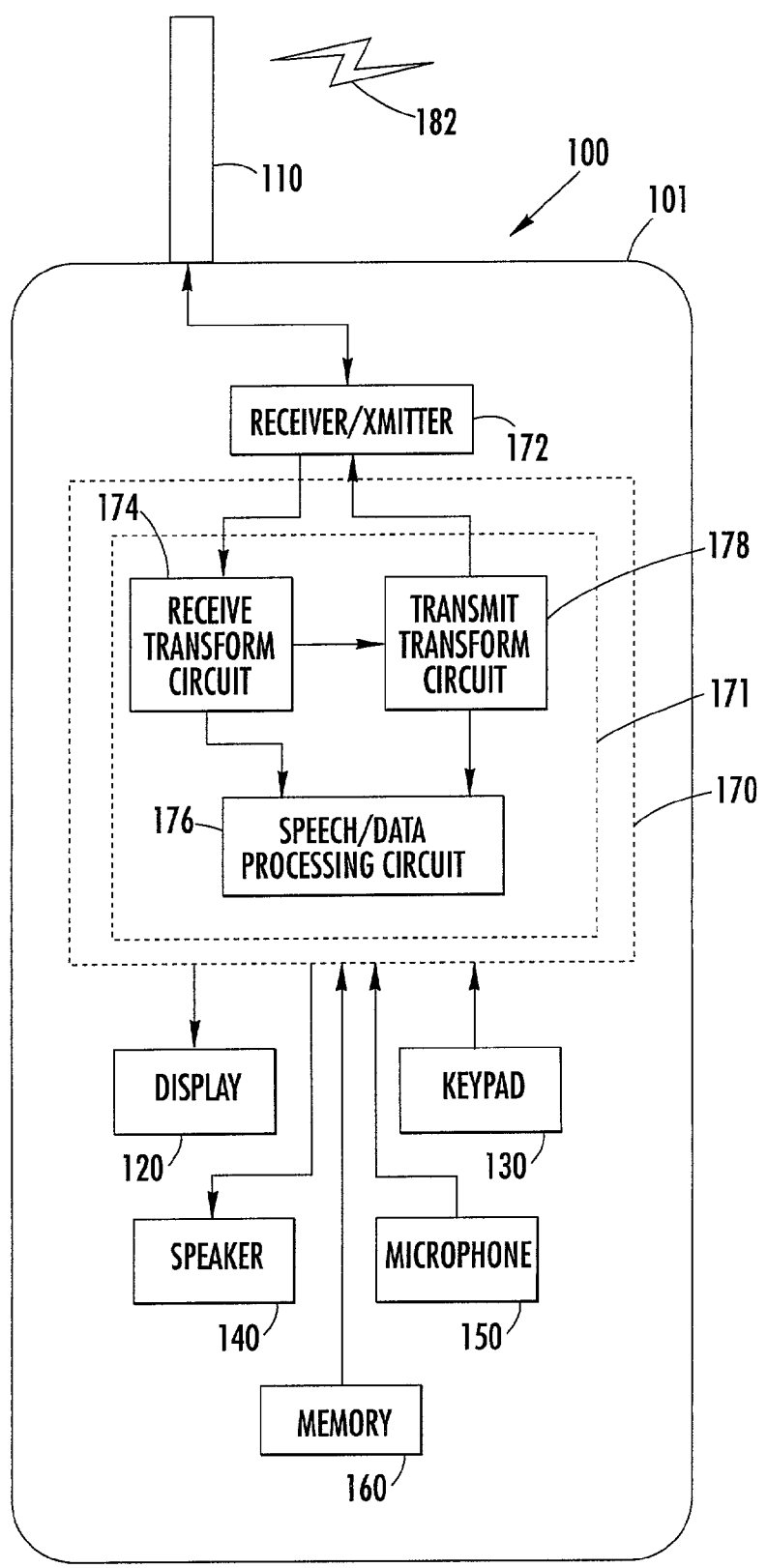
FIG. 5 is a block diagram illustrating a mobile terminal according to embodiments of the present invention.

FIG. 5 illustrates an exemplary mobile terminal 100 according to embodiments of the present invention. The mobile terminal 100 includes a transceiver (i.e., receiver and transmitter) 172 that is operative to transmit and receive RF communication signals via an antenna 110 under control of a controller 170. The controller 170 includes a baseband processor 171 as well as other functional modules not illustrated in FIG. 4 but which will be understood to those of skill in the art related to wireless communications including both data and voice communication support. As used herein, the baseband processor 171 may include components such as demodulators (sometimes, but not herein, classified as part of the RF circuitry rather than the baseband circuitry), decoders, interleavers, etc. that support output at a symbol rate. However, it will be understood by those of skill in the art that a mobile terminal 100 typically further includes RF processor circuitry, such as downsampling circuitry, which may be understood as being included in the transceiver 172.

The controller 170 processes messages to produce physical layer bursts that are transmitted over physical wireless channels by the transceiver 172 via the antenna 110. The baseband processor 171 includes a receive transform circuit 174, such as a demodulator or a demodulator and a decoder, a transmit transform circuit 178, and typically includes a speech/data processing circuit 176 suitable for the particular use environment of the mobile terminal 100. The controller 170, such as a microprocessor, microcontroller or similar data processing device, may execute program instructions stored in a memory 160 of the mobile terminal 100, such as a dynamic random access memory (DRAM), electrically erasable programmable read-only memory (EEPROM) or other storage device. The controller 170 is further operatively associated with user interface components of the mobile terminal 100 such as a display 120, a keypad 130, a speaker 140, and a microphone 150, operations of which are known to those of skill in the art and will not be further discussed herein.

The transceiver 172 provides a receiver that receives a block of L received encoded signal values including soft information (i.e., having not yet had a hard decision applied) over the channel 182 and provides the signals to the receive transform circuit 174. The receive transform circuit 174 is configured to transform L received encoded signal values from the transceiver 172 to L data symbols using associated spectral energy at a plurality of frequency ranges within the bandwidth of a channel 182 over which the L received encoded signal values are received for decoding each data symbol. The transmit transform circuit 178 may operate in a manner similar to the receive transform circuit 174 but to encode signals for transmission rather than decoding received signals. The various components of the mobile terminal 100 are further shown as being positioned within a portable housing 101.

It will be appreciated that the transceiver 172, the baseband processor 171 and other components of the mobile terminal 100 (as well as circuitry illustrated in FIGS. 6A–6C, 7 and 8) may be implemented using a variety of hardware and software. For example, operations of the transceiver 172 and/or the baseband processor 171 may be implemented using special-purpose hardware, such as an application specific integrated circuit (ASIC) and programmable logic devices such as gate arrays, and/or software or firmware running on a computing device such as a microprocessor, microcontroller or digital signal processor (DSP) as shown for the baseband processor 171 in FIG. 5. It will also be appreciated that, although functions of the transceiver 172 and/or the baseband processor circuit 171 may be integrated in a single device, such as a single ASIC microprocessor, they may also be distributed among several devices. Aspects of the transceiver 172, the baseband processor 171 and the controller 170 may also be combined in one or more devices, such as an ASIC, DSP, microprocessor or microcontroller. These various implementations using hardware, software, or a combination of hardware and software will generally be referred to herein as "circuits."

It is further schematically illustrated in FIG. 5 that the mobile terminal 100 may receive communicated signals over a communication channel 182, from various communication service providers. It is to be further understood that a wireless communication system supporting the communication channel 182 may include a variety of different configurations of components such as base stations, sometimes referred to as "base transceiver stations," mobile switching centers (MSCs), telecommunications switches, and other communications components which will generally be referred to herein as "base stations" and which may be provided with circuits corresponding to those described above for mobile terminal 100 in accordance with the present invention.

Figure 6A:
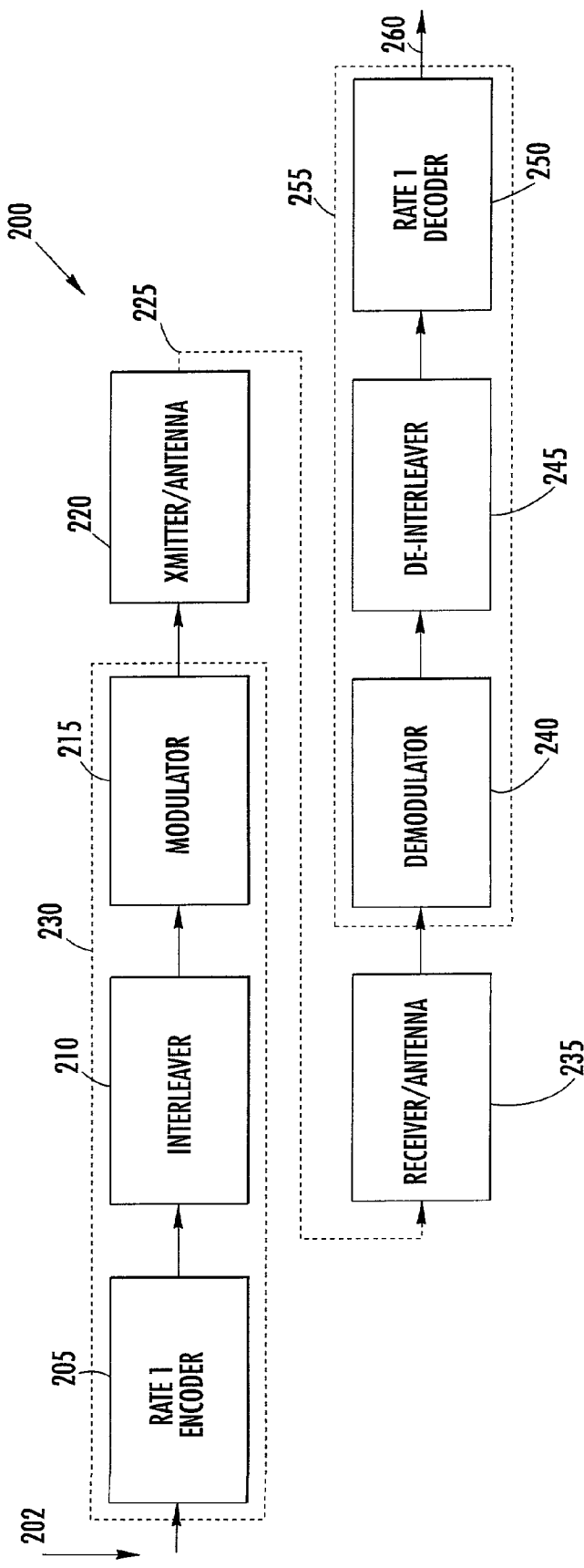
FIG. 6A is a block diagram illustrating a wireless receiver according to embodiments of the present invention.

The present invention will now be further described with reference to various embodiments shown in FIGS. 6A–6C. Referring first to the embodiments of FIG. 6A, a wireless receiver (235, 240, 245, 250) according to embodiments of the present invention will be described. FIG. 6A also shows transmit circuitry (202, 205, 210, 215, 220). Furthermore, while interleaving circuitry is included as illustrated in the embodiments of FIG. 6A, such circuitry need not be utilized in various embodiments of the present invention.

Referring first to the transmit side circuitry shown in the embodiments of FIG. 6A, input source symbols 202 are received by a rate one encoder 205. It is to be understood that, as used herein, a rate one encoder refers to an encoder having only one output signal value per input symbol. Embodiments of FIG. 6A herein described include a rate one convolutional encoder 205 used with a source-controlled rate 1 convolutional decoder 250; a WALSH transform rate one encoder 205 used with a WALSH transform rate one decoder 250 with or without interleaving, and a Fourier Transform rate one encoder 205 used with a Fourier Transform rate one decoder 250 with interleaving. The interleaver 210 interleaves encoded symbols from the rate one encoder 205 and places successive ones of the encoded symbols from the rate one encoder 205 in non-successive time positions in a transmit stream provided to the modulator 215 for modulation and transmission by the transmitter/antenna 220 over a communication channel 225 which, typically, is subjected to both Gaussian and non-Gaussian noise.

Note that the communication channel 225 may be a wireless channel or may be a communications link which is wired or a link such as might be utilized for transfer of data from a storage device such as a magnetic drive device. Note that the rate one encoder 205 and the modulator 215 are included in the transmit transform circuit 230 that provides for rate one coding to a modulated transmit signal. While the rate one coding is illustrated in FIG. 6A as being provided by an encoder 205, the output of which is ultimately fed to a separate modulator 215, it is to be understood that the modulator 215 may be an encoding modulator and the rate one encoding according to the present invention may be implemented in the modulator 215 rather than through the utilization of a separate encoder 205.

A block of L encoded signal values on the channel 225 may be received by the receiver/antenna 235 which is configured to receive and demodulate L received encoded signal values including soft information. The received information is provided to the receive transform circuit 255 which provides one output value per input value. More particularly, the receive transform circuit 255 demodulates the L received encoded signal values and decodes the demodulated L received encoded symbol values using a rate one decoding operation having one output symbol per input value to provide L data symbols. For the embodiments illustrated in FIG. 6A, a separate demodulator 240, de-interleaver 245 and rate one decoder 250 are provided in the receive transform circuit 255 and operate to, essentially, reverse the operations described previously with reference to the transmit transform circuit 230. Corresponding L data symbols 260 are thus output by the receive transform circuit 255.

Figure 6B:
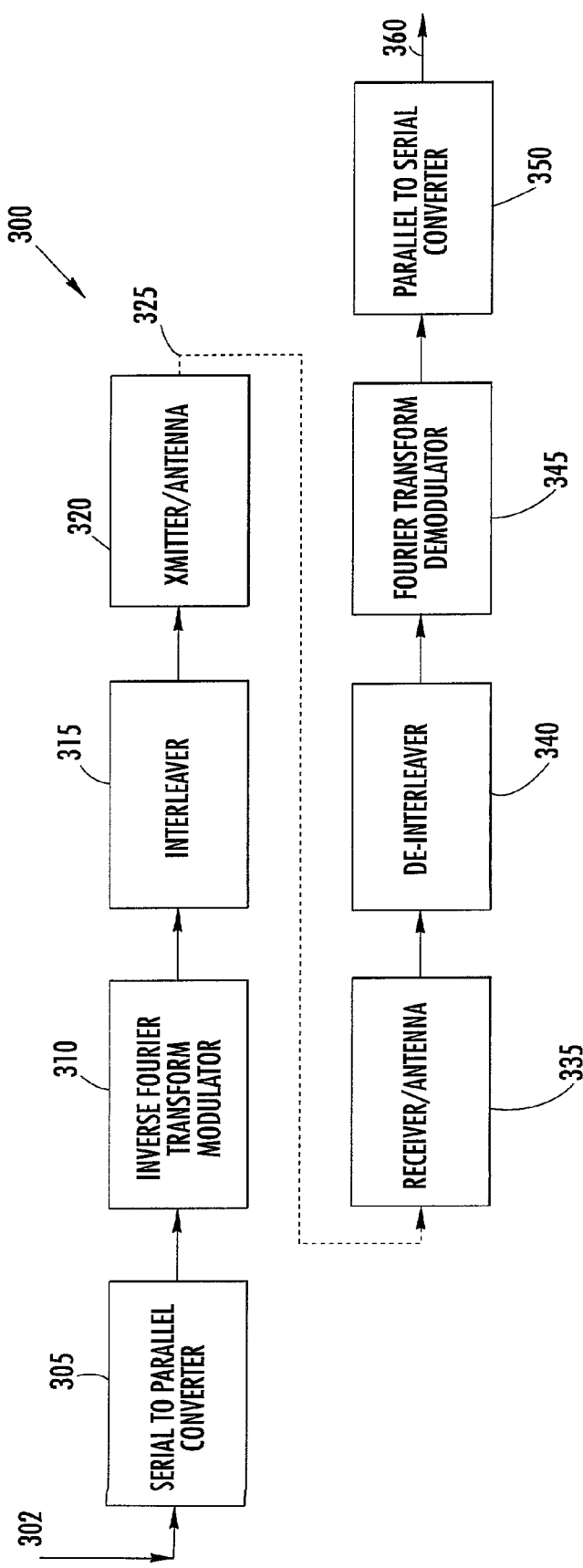
FIG. 6B is a block diagram illustrating a wireless receiver according to further embodiments of the present invention.
Figure 6C:
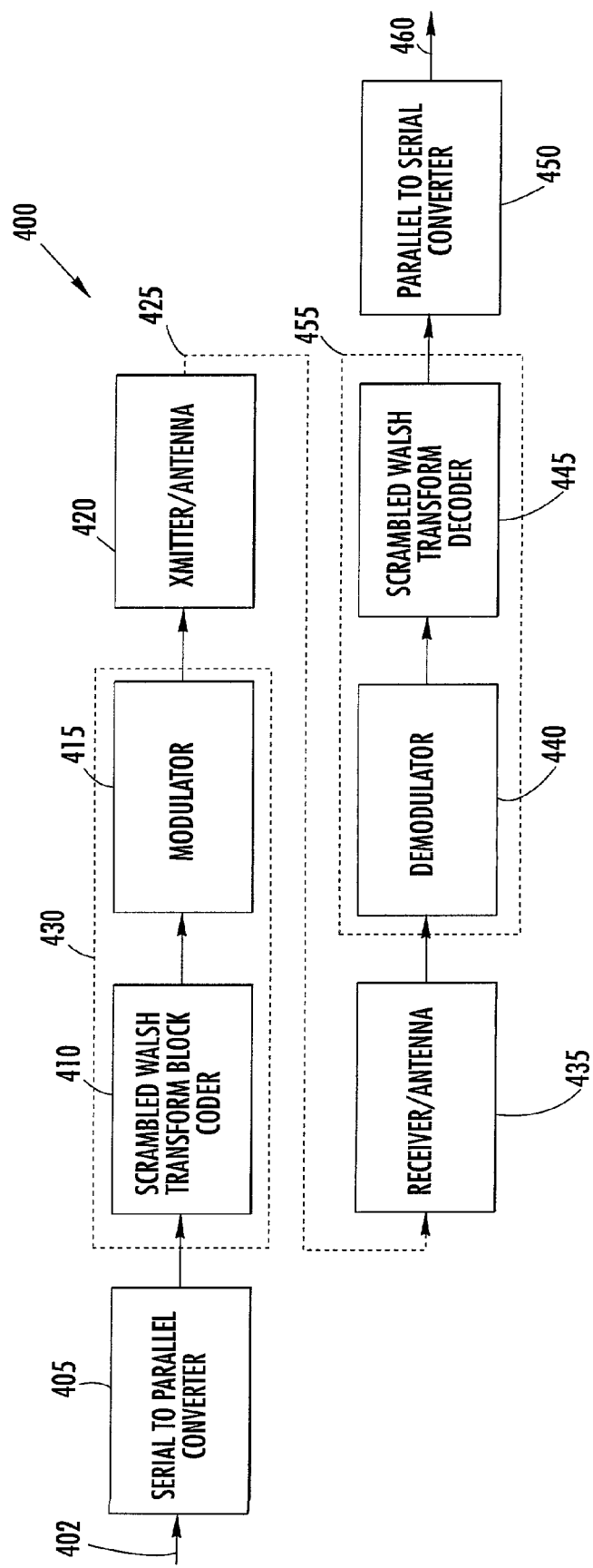
FIG. 6C is a block diagram illustrating a wireless receiver according to yet further embodiments of the present invention.

FIGS. 6B and 6C further illustrate various embodiments of the present invention in which the receive side transform circuitry transforms L received encoded signal values to L data symbols 360 using associated spectral energy at a plurality of frequency ranges within a bandwidth of a channel 325 over which the L received encoded signal values are received to decode at least one, and in various embodiments all, of the L received encoded signal values. The plurality of frequency ranges may be substantially all frequencies within the bandwidth of the channel 325 utilized to transmit the block of L encoded signal values. The transmit side circuitry shown in FIG. 6B includes a serial to parallel converter 305, an inverse Fourier transform modulator 310, an interleaver 315 and a transmitter/antenna 320. This circuitry generates L encoded signal values for transmission over the channel 325 from L source symbols 302. A block of L source symbols 302 is converted to a parallel form by the serial to parallel converter 305 and input to the inverse Fourier transform modulator 310 which typically places each of the L input values on a different carrier within a range of the bandwidth of the channel 325 used to transmit the L encoded signal values as will be understood by those of skill in the art. If this signal was transmitted without interleaving, it corresponds to the prior art known as "multi-tone modems" in which each data symbol is transmitted using only a narrow sub-band or sub-carrier within the channel bandwidth. In this prior art, selective fading, which can notch out particular sub-carriers, causes loss of the associated symbols. Embodiments of the present invention may avoid this loss due to selective fading by arranging that each symbol is transmitted by using substantially all of the channel bandwidth. Selective fading then may degrade all symbols a little rather than erasing certain symbols completely.

For example, the output of the Fourier Transform modulator 310 may be interleaved using the interleaver 315. Such interleaving provides for the use of associated spectral energy at a plurality of frequency ranges within the bandwidth of the channel 325 for each of the input symbols to the inverse Fourier transform modulator 310 as contrasted with the limited frequency range spectral energy distribution for each of the symbols from an inverse Fourier transform modulator 310 without interleaving. Transmitter 320 then transmits the interleaved L encoded values over the channel 325 using the full bandwidth over which the L encoded signal values are to be transmitted. The inverse Fourier transform modulator 310 combined with the interleaver 315 thus may provide an orthogonal encoder/modulator.

The receiver/antenna 335 is configured to receive L received encoded signal values including soft information over the channel 325 using the bandwidth over which all of the encoded signal values were transmitted. The de-interleaver 340 and the Fourier transform demodulator 345 provide a receive transform circuit that transforms the L received encoded signal values to L data symbols 360 using associated spectral energy at a plurality of frequency ranges within the bandwidth of the channel 325 over which the L received encoded signal values are received for at least one of the L received encoded signal values and, preferably, all of these values. The de-interleaver 340 de-interleaves received signals from the receiver/antenna 335 to, essentially, undo the interleaving provided by the protocol of the interleaver 315 and provides the de-interleaved signals to the Fourier transform demodulator 345. Note that while in the illustrated embodiments of FIG. 6B an inverse Fourier transform modulator 310 is used on the transmit side and a Fourier transform demodulator is correspondingly used at the receive side, the opposite may be provided with the inverse being utilized for the receive side demodulator 345 and the Fourier transform being utilized for the modulator 310 on the transmit side in keeping with the present invention. The output of the Fourier transform demodulator 345 may then be placed in serial form by the parallel to serial converter 350 to provide a serial stream of L data symbols 360 for further processing. the subject matter of which may be application dependent and is beyond the scope of the present invention.

Referring now to FIG. 6C, further embodiments of the present invention utilizing a Walsh transform demodulator/decoder and, more particularly, a scrambled Walsh transform demodulator/decoder will now be further described. As with the embodiments of FIG. 6B, the embodiments of FIG. 6C may be utilized to provide an orthogonal transform demodulator/decoder as will be understood by those of ordinary skill in the art. L source symbols 402 are converted to parallel form to define a block of L symbols by serial to parallel converter 405 on the transmit side. The symbols are then converted by the transmit transform circuit 430 which transforms L source symbols 402 to L transmit encoded signal values using associated spectral energy at a plurality of frequency ranges within the bandwidth of the channel 425 over which the L received encoded signal values are to be transmitted, for at least one of the L transmit encoded signal values, and, in various embodiments, for all of the transmit encoded signal values.

A prior art, non-scrambled Walsh transform also may have the property of the prior art, non-interleaved Fourier Transform, namely that certain symbols would be encoded using only parts of the channel bandwidth, therefore rendering them susceptible to selective fading. For example, the 8-point Walsh code set given by:

CODE 1=1 1 1 1 1 1 1 1
CODE 2=1 0 1 0 1 0 1 0
CODE 3=1 1 0 0 1 1 0 0
CODE 4=0 1 1 0 0 1 1 0
CODE 5=1 1 1 1 0 0 0 0
CODE 6=1 0 1 0 0 1 0 1
CODE 7=1 1 0 0 0 0 1 1
CODE 8=1 0 0 1 0 1 1 0 shows that codes 2, 3, 4 and 5 are simply square waves, and code 1 is "D.C." These codes have spectra occupying the receiver bandwidth in certain regions and not in others. When more even spectral distribution is desired, the interleaving of WALSH codes disclosed here may be used, or, alternatively, the selection of a code for a particular data signal pattern can be systematically altered as a function of time, i.e., "code hopping."

As shown in the embodiments of FIG. 6C, the Walsh based transmit transform circuit 430 includes a scrambled Walsh transform block coder 410 and a modulator 415. However, it is to be understood that the Walsh transform based rate one code having one transmit symbol for each input symbol may be implemented directly in a modulator without utilizing separate block coder and modulator circuits.

The block of L encoded signal values are then transmitted by the transmitter/antenna 420 and received by the receiver/antenna 435 to provide L received encoded signal values including soft information to the receive side Walsh transform circuit 455. The receive side transform circuit 455, as shown in FIG. C, is a Walsh transform demodulator/decoder that receives the L received encoded signal values from the receiver/antenna 435 and outputs the L data symbols 460 which may be placed in a serial symbol stream form by the parallel to serial converter 450. For the embodiments illustrated in FIG. 6C, a separate demodulator 440 and a Walsh transform decoder 445 are provided in the receive transform circuit 455. The demodulator 440 receives the L encoded signal values and outputs complex received signal estimates in various embodiments of the present invention utilizing phase and amplitude information together to provide support for non-binary symbols to be communicated. However, the present invention may equally be provided in combination with binary transmit symbols having only a one and zero state without requiring complex received symbol estimates and rely solely on the use of the real or amplitude information from a received signal. The Walsh transform decoder 445 decodes the received symbol estimates, either complex or real, to provide the L data symbols 460. More particularly, a scrambled Walsh transform decoder 445 is utilized for the illustrated embodiments, such as those described in U.S. Pat. No. 5,353,352 entitled "Multiple Access Coding for Radio Communications" to Dent et al., which is incorporated herein by reference as if set forth in its entirety.

Various convolutional coding embodiments of the present invention will now be described with reference to the convolutional coder shown in FIG. 4. At the instant depicted in FIG. 4, the output bits are given by:

P11=B1+B2+B3+B5+B6
P12=B1+B4+B5
P13=B1+B2+B4+B6

At subsequent instants, the output bits will be given by:

P21=B2+B3+B4+B6+B7
P22=B2+B5+B6
P23=B2+B3+B5+B7
P31=B3+B4+B5+B7+B8
P32=B3+B6+B7
P33=B3+B4+B6+B8
etc..

The parity bits Pij may be arranged in columns j=1,2,3 on sequential shifts i=1,2,3,4 of the encoding process as follows:

P11 P21 P31 P41 P51 P61 . . .
P12 P22 P32 P42 P52 P62 . . .
P13 P23 P33 P43 P53 P63 . . .

Which of these are affected by B6, for example, as it moves through the encoding shift register can be indicated by a cross in the appropriate box of this 3 by 6 matrix:

| x | x |   | x | x | x |
|   | x | x |   |   | x |
| x |   | x | x | x | x |

Thus, any bit, such as B6, affects a number of transmitted bits equal to the number of crosses above. A mistake in decoding B6 would, therefore, cause mismatch between 12 of the received bits and their corresponding expected values, and it is, thus, less likely that an uncorrectable mistake will be made in decoding.

The reduction in error rate may still be large even if not all of the twelve Pijs that are affected by B6 are transmitted. For example, if P1, P22 and P33 are not transmitted, all of which depend on B6, then the number of transmitted bits that depend on B6 will be 9 instead of 12. At the same time the number of transmitted bits that depend on B1 reduces to 11, on B2 to 10, on B3 to 10, B4 to 11 and on B5 to 10.

In general, by targeting to delete transmitted bits that depend on B6 it may be arranged that the amount of coding given to B6 is mainly reduced while causing a smaller loss of coding protection for neighboring bits. The protection given to each data bit encoded by such a punctured code can ultimately be related to the number of transmitted bits that depend on it and, so, that data bit can be used for a speech bit of corresponding perceptual significance.

If a regular pattern of deletions is employed, for example, by deleting one Pij out of the three in every column, a rate ½ code may be produced. The deleted P bit should not necessarily always be in the same row, but might be permuted according to a regular puncturing pattern. Likewise, a rate ⅔ code can be produced by deleting two P bits from half the columns and one P bit from the other half, so that three bits are transmitted for every two encoding register shifts.

The present inventor has determined that a rate one code can be produced by, for example, deleting all except one P bit in every column while still obtaining benefits. Note that the number of transmitted bits depending on a given data bit does not necessarily reduce to one, as it would for no coding at all.

For example, if the bits transmitted are:

P11, P22, P33,P41, P53,P62; P71, P82,P93, etc., then B6 still affects six transmitted bits. If these are interleaved to different transmission window (frames) or different positions within a frame where fading is substantially uncorrelated, then a measure of protection of B6 against fading may be obtained without having increased the number of transmitted bits. A Viterbi decoder may still be employed to decode this rate one coding. Such a rate one code in accordance with the present invention with a long constraint length may provide substantially the same bit error rate curve for a Rayleigh fading channel as for a static channel, as the sum of the Rayleigh faded noise contributions to the metric of a given decoded bit will, pursuant to the central limit theorem, simply approach Gaussian noise with the same mean variance.

Accordingly, various embodiments of the present invention provide a convolutional coder (encoder) which produces only one output parity symbol P1 for each data bit shifted through the encoder. It may, for example, be a coder as schematically illustrated in FIG. 7.

Figure 7:
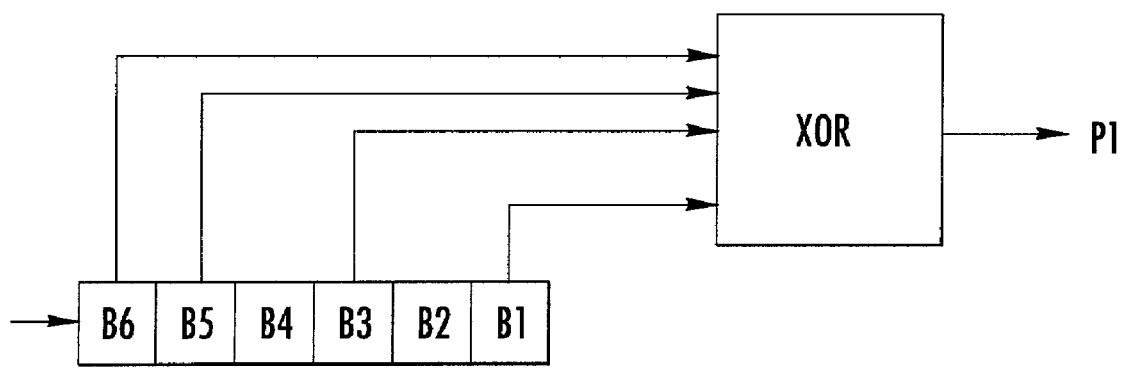
FIG. 7 is a block diagram illustrating a rate one encoder according to embodiments of the present invention.

The coder shown in FIG. 7 may be characterized by the equation:

$$Pi=Bi+B(i+1)+B(i+2)+B(i+4)+B(i+5)$$

or some such similar equation. Five of the output parity bits produced will, in this example, have a dependence on a particular data bit. These five parity bits are, in various embodiments, transmitted in different time positions, different signal bursts or on different frequencies such that the fading, noise and interference on each is uncorrelated (i.e., non-sequentially transmitted). An odd number of terms may be used in the equation as, with an even number, an inversion of the data bits may not cause an inversion of the transmitted bit sequence, and there may be no way to distinguish a data pattern from its inverse at the decoder. This may be avoided by the use of an odd number of taps (terms).

Figure 8:
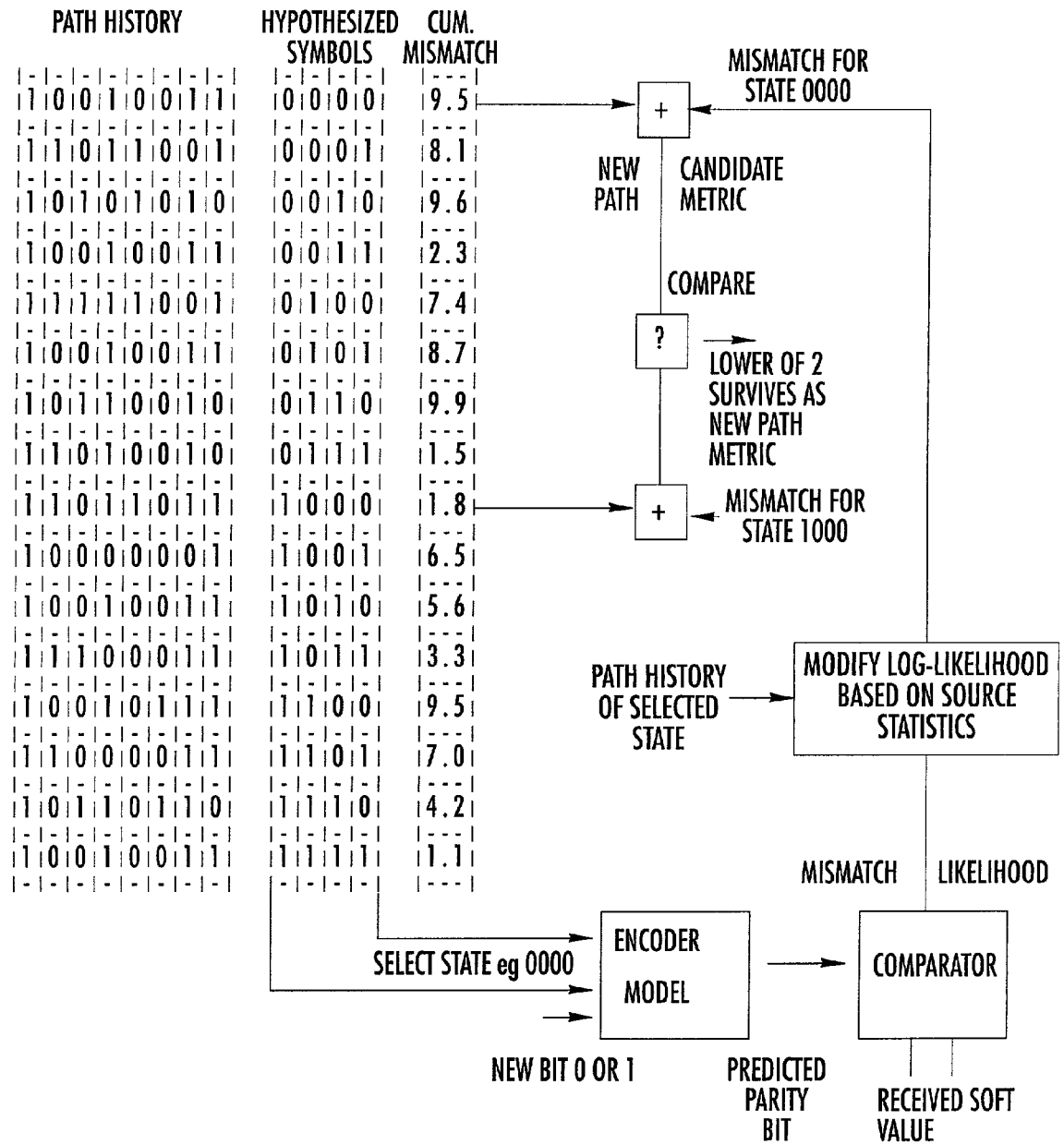
FIG. 8 is a block diagram illustrating a rate one decoder according to embodiments of the present invention.

A corresponding decoder is illustrated in FIG. 8. The decoder shown in FIG. 8 uses the minimum least squares error (MLSE) algorithm. This is simplified for purposes of illustration in FIG. 8 to a constraint length 5 code, which requires a 16-state machine. The principle is the same for a constraint length 6 or more however, the number of states just being increased to 2 to the power L−1 where L is the constraint length.

Operations of the decoder of FIG. 8 will now be further described. Initially, the path history memory is empty and the cumulative mismatch values, known as path metrics, are set to zero. The four hypothesized bits 0000 from the first state plus a new hypothesis of 0 are then applied to the constraint length 5 encoder, that is, they are regarded as the contents of the five bit encoding shift register. The encoder produces the parity bit output that should be received if the transmitter had the same register contents. This is compared with the received bit and a mismatch generated. The received bit value is preferably a so-called "soft-decision," or soft information meaning that the signal received over the radio channel is not quantised to +/−1 ("hard decision") but rather to +/−Q, where Q is a quality measure which may, for example, be dependent on the estimated signal to noise ratio of that bit. The signal level of a bit can be represented by its received signal strength while the noise can be determined from the root mean square (rms) departure of received bits in the same vicinity from a mean amplitude value, for example. By way of illustration, consider a received sequence:

1.1, −0.8, 1.2, −1.1, −0.6, −1.2 . . .

The average amplitude of these bits is (1.1+0.8+1.2+1.1+0.6+1.2)/6=1.0. The rms departure from this mean amplitude may be expressed as:

$$SQRT((0.1^2+0.2^2+0.2^2+0.1^2+0.4^2+0.2^2)/6)=SQRT(0.05)=0.224.$$

The soft value of the first bit is, thus, 1.1/0.224; that of the second bit is −0.8/0.224, etc. If a predicted parity bit has the same sign as a received soft value, the magnitude of the soft value Q (with a positive sign) for the example of FIG. 8 will be subtracted from the previous path metric to produce the new candidate metric. If the predicted parity bit has an opposite sign to the soft value received, the value of Q will instead be added to the path metric.

The above method of defining soft values described with reference to FIG. 8 is merely illustrative and the invention is not so limited. The exact definition of soft information should be made in conjunction with the modulation and demodulation method employed for transmission. An alternative, for example, is to include in the MLSE processing a model of the modulator and the radio channel, and to predict the actual signal (which may be a complex number) that should be received if the predicted parity bit was indeed transmitted. In this case, the comparator computes the square Euclidean distance between the received and predicted quantity, and adds this to the previous path metric.

The described decoding process is repeated for the state having the opposite sign of the leftmost hypothesized bit, i.e., 1000, and with the same new bit hypothesis of 0. A second candidate metric is, thus, obtained, which is compared with the first candidate metric. The lower of the two is selected to be the new path metric for a new 0000 state. The path history of the selected predecessor state is also selected to be the path history of the new 0000 state, and a 0 or 1 shifted left into the path history accordingly as old state 0000 or 1000 based on which was the selected one. The above procedure may be repeated for a new '1' to give a new state 0001 and then the whole procedure may be repeated for all pairs of states, such as 0001 and 1001, 0010 and 1010, etc, with, in turn, a hypothesis of a new '0' and then a new '1' in order successively to generate a whole set of 16 new states.

In this way, a set of path histories reflecting all possible decoded bit sequences that minimize the cumulative path metric are generated. The path histories are the predicted best bit sequences that end most recently with the four associated hypothesized bits indicated. Due to the overwriting of path histories that occurs when the lower of two path metrics is selected, the older bits in the path histories tend more and more to agree the longer they have survived. If the oldest (rightmost) bit in all path histories agrees, it may be extracted as a definite (hard) decision for that bit, and the path histories shortened by one bit. In this way, new received data "flushes through" the older decoded bits and, thus, there is always some delay in producing a decoded output corresponding to an input sample. This is partly due to the information not being contained in a single input signal sample, but, instead, being spread over several samples. If interleaving is used in the transmission, such that the decisions have independent quality values, the final error rate will tend to depend on the mean quality level and not on the instantaneous corruption of a single sample by noise. Note that it may be shown that there is no net advantage when the noise has stationary Gaussian statistics, and, indeed, the rate one convolutional coding described with reference to FIG. 8 above may then even be a disadvantage by increasing the length of error bursts.

The coding described for FIGS. 7 and 8 is, essentially, a mapping between all possible messages to other messages but, with the characteristic that a single error in determining which of two transmitted messages differing only in one bit was received maps to multiple errors in the decoded messages. However, the use of soft information avoids quantizing the received message to a set of binary bits before re-mapping, thus generally avoiding this particular possible problem. The decision on the decoded message is instead based on soft information such as metrics which are the sums of many different soft values spread out in time over the interleaving period. This can be an advantage when the channel is, for example, subject to Rayleigh fading, so that some soft values are of worse quality than others. The rate one coding described above then makes decisions on the decoded message with a reliability which may be dependent on the average signal to noise ratio which would pertain if there was no fading, and, thus, may help to mitigate such fading.

Rate one convolutional coding may be combined with other layers of coding, such as block coding, to provide a further reduction in error rate. In its simplest form, block coding can comprise the addition of a Cyclic Redundancy Check code to the message that allows detection of uncorrected errors, and, sometimes, the correction of a limited number of errors. More complex codes, such as Reed-Solomon block coding or Fire codes, are known to be advantageous in correcting the burst errors that may occur in the output of a convolutional decoder and may be employed with the inventive rate one coding described above.

The rate one coding described above has the property that it maps two-valued binary symbols to other corresponding two-valued binary symbols, in distinction from a conventional convolutional structure which maps data symbols to a greater number of data symbols. If the conventional method is used, for example, by replacing modulo-2 addition by arithmetic addition, this is essentially equivalent to convolutional coding followed by multi-bit symbol modulation, and is also equivalent to the use of a linear, premodulation filter which will not necessarily produce any effect of merit for a flat, unfaded channel. A message so coded may also be considered as having been transformed by multiplication with a large band matrix, and the receiver can decode the signal by multiplication of received soft values with the inverse matrix, also known as an inverse channel filter. The inverse channel filter only exists if the matrix is invertable. When continuous convolutional coding is employed, the above band matrix is infinite in size. Often, however, convolutional coding of blocks of data is used, the blocks being terminated either by the use of known tail bits to flush through the remaining contents of the encoding register, or else by feeding the first data bits in again, known as "tailbiting." In the case of block-convolutional coding, the matrix is finite, and when tail bits are used, is also typically overdimensioned allowing a least squares solution to be used which may improve error-rate performance at least for some bits. The rate one convolutional coding described with reference to FIGS. 7 and 8 can use tail bits to compensate for lack of transmission redundancy.

When blocks of bits are coded, it can be questioned whether the convolutional type band matrix is the optimum transform to analog values. The most desirable property of such a transform is generally that the matrix should have a large determinant, i.e., far from singular. The types of matrix having determinants farthest from singular have rows (and columns) which are all mutually orthogonal to each other, i.e., an orthogonal transform such as a Fourier, Walsh or hybrid Walsh-Fourier transform. The Fourier transform generally uses complex coefficients while the Walsh transform typically uses only real coefficients. Thus, rate one coding in accordance with the present invention may be applied when either the symbols are complex, as in Quadrature Phase Shift Keying (QPSK), or the transmitted values are complex, as with Offset Quadrature Phase Shift Keying (OQPSK) or Gaussian Minimum Shift Keying (GMSK) or Continuous Phase Modulation (CPM) or (Continuous Phase Frequency Shift Keying (CPFSK), or both.

If the Fourier transform is used, this is substantially equivalent to transmitting one symbol of the message on a different sub-frequency, which may be compared to what is known in the prior art as a "multi-tone modem." Multi-tone modems are known and may be used to combat multipath channels that are encountered over high frequency (HF) radio paths, for example. With such known modems, the transformed components of the same data block generally had to be transmitted sequentially in time on order to produce the multi-tone signal. There was, therefore, no large amount of time interleaving to combat fading. In keeping with the present invention, the transformed components could, instead, be transmitted interleaved with the transformed components of other blocks, thereby potentially achieving some protection against fading. The reconstruction of a block by deinterleaving followed by an inverse orthogonal transformation then may be implemented by providing each transmitted signal burst with a phase reference signal so that the phase changes occurring between widely time-separated blocks can be restored. In multi-tone modems, frequency-selective fading can "knock out" one or more sub-frequencies and cause an error in one or more data symbols. The use of other than Fourier transforms may alleviate the above effect, such as the Walsh transform or Walsh transform using codes scrambled, for example, as described in U.S. Pat. No. 5,353,352 which was incorporated by reference above. When scrambled Walsh codes are used to form an orthogonal transform, different scrambling can be used for other, interfering signals so that the interference does not directly look like a particular message of the wanted signal.

Operations according to embodiments of the present invention will now be described with reference to the flowchart illustration of FIG. 9. Note that operations will be described with reference to FIG. 9 and FIG. 10 for both transmit side and receive side operations. However, it is to be understood that the present invention may be provided for either transmit operations, receive operations or a combination of transmit and receive operations and is not to be limited to combining both transmit and receive operations according to the rate one coding methodologies of the present invention in a single device. Operations begin in the embodiments of FIG. 9 at block 500 by transforming L source data symbols to L encoded signal values. The L encoded signal values are transmitted in a form suited to generate soft information corresponding to the L encoded signal values when received at a receiver (block 505). More particularly, for the embodiments shown in FIG. 9, operations at block 500 include transforming the L source data symbols as a block to L encoded signal values for transmission using associated spectral energy at a plurality of frequency ranges within a bandwidth of a channel over which the L encoded signal values are transmitted for at least one of the L encoded signal values, and, in various embodiments, all of the L encoded signal values. Furthermore, at block 505 operations include transmitting the L encoded signal values using associated spectral energy at the plurality of frequency ranges at the bandwidth of the channel over which the block of L encoded signal values are transmitted.

Figure 9:
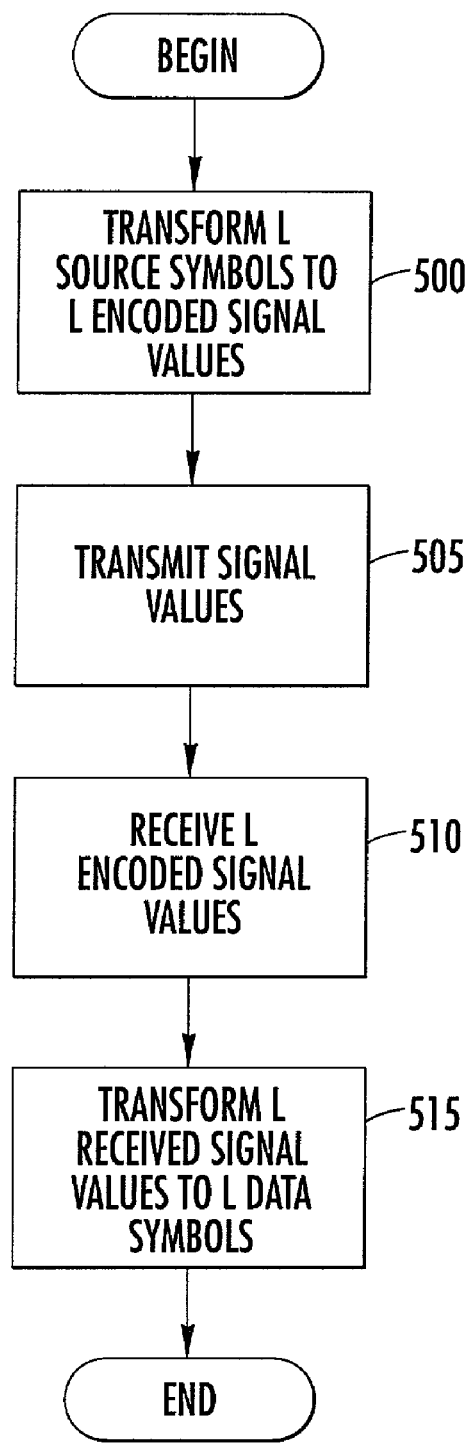
FIG. 9 is a flowchart illustrating processing operations for communicating encoded data according to embodiments of the present invention.

Receive side operations will now be generally described for the embodiments of FIG. 9 with reference to blocks 510 and 515. The L encoded signal values are received in a form including soft information associated with the L received encoded signal values (block 510). The L received signal values are transformed to L data symbols (block 515). More particularly, for the embodiments illustrated in FIG. 9, operations at block 515 include transforming the L received encoded signal values using associated spectral energy at a plurality of frequency ranges within a bandwidth of a channel over which the L received encoded signal values are received for at least one of the L received encoded signal values.

Various approaches may be utilized for operations at block 515. For example, the L received signal values may be orthogonal transform demodulated to provide the L data symbols. Alternatively, operations at block 515 may include Fourier transform or inverse Fourier transform demodulating the L received encoded signal values and de-interleaving the L received encoded signal values to provide the L data symbols. A selection of Fourier transform or inverse Fourier transform demodulating should be selected to be complimentary to the form of modulation used at the transmit side in generating the L encoded signal values. In further embodiments, operations at block 515 include Walsh transforming the L received encoded signal values to provide the L data symbols. A scrambled Walsh transform may be used in various embodiments of the present invention to transform the L encoded signal values to provide the L data symbols.

As described above with reference to FIG. 9, the L source symbols may be transformed as a block to provide the L encoded signal values for transmission and, similarly, the L received encoded signal values may be transformed as a block generate L data symbols. The L data symbols may be provided as real numbers or as complex symbols. Furthermore, the symbols may be binary symbols or may be higher order symbols having more than two states as will be understood by those of ordinary skill in the art.

Figure 10:
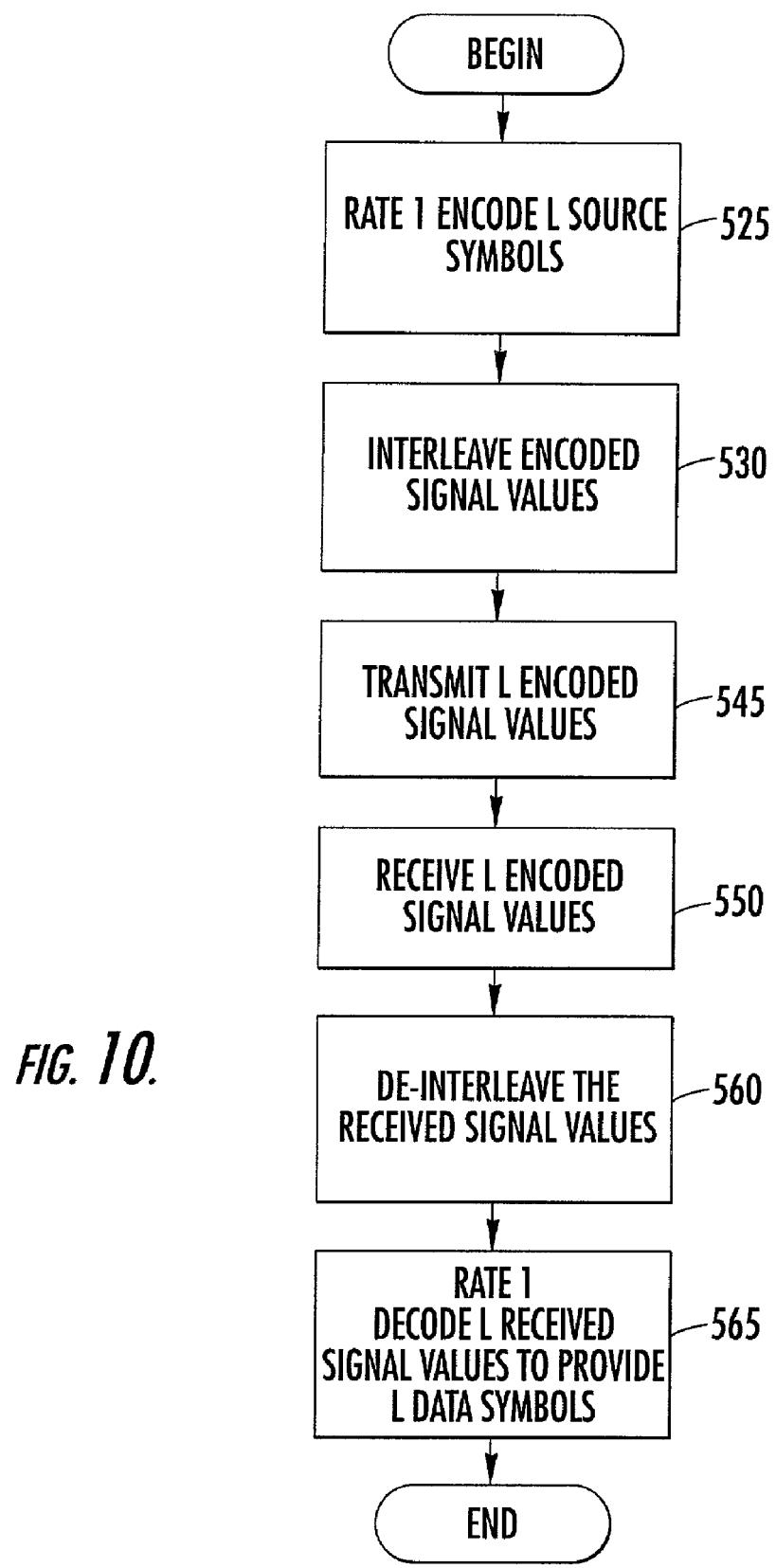
FIG. 10 is a flowchart illustrating processing operations for communicating encoded data according to further embodiments of the present invention.

Referring now to the flowchart illustration of FIG. 10, operations for communicating encoded data according to further embodiments of the present invention will now be further described. Operations begin at block 525 with rate one convolutional coding of L source data symbols using a rate one convolutional encoder having only one output symbol per input symbol to provide L encoded signal values. In various embodiments of the present invention, the rate one encoded L encoded signal values may be interleaved with other signal values for transmission at non-successive time intervals (block 530). The L transmit encoded signal values are transmitted over a channel subject to non-Gaussian noise (block 545).

Receive side operations for the embodiments illustrated in FIG. 10 will now be further described with reference to blocks 550–565. Receive operations begin at block 550 when the L encoded signal values are received. Where the L encoded signal values have been interleaved prior to transmission, the received signal values are de-interleaved (block 560). The L received encoded signal value are convolutional decoded using a rate one convolutional decoder having only one output symbol per input symbol to provide the L data symbols (block 565).

Note that the described receive operations typically include a demodulating step which may be performed prior to rate one convolutional decoding operations or integrated therewith. The demodulating operations may generate an output in a soft information form providing the soft information for use in rate one convolutional decoding. Alternatively, soft information may be provided by a signal strength determination circuit generating signal strength information corresponding to respective received encoded signal values. A signal strength determination circuit may be provided, for example, as part of the transceiver 172 illustrated in FIG. 5 or the respective receiver/antenna circuits 235, 335, 435 illustrated in FIGS. 6A–6C. The signal strength determination circuit may also be implemented as a component of the respective demodulator 240, 440 illustrated in FIG. 6A and FIG. 6C. Similarly, for the embodiments of operations described with reference to FIG. 9, soft information as described therein may be provided by a variety of means as will be understood by those of skill in the art such as a soft information output of a demodulator or a signal strength indication from a received signal strength determination circuit as described herein.

Operations of the present invention have been described with respect to the block diagram illustrations of FIGS. 5–8 and the flowchart illustrations of FIGS. 9–10. It will be understood that each block of the flowchart illustrations and the block diagram illustrations of FIGS. 5 through 10, and combinations of blocks in the flowchart illustrations and the block diagram illustrations, can be implemented by computer program instructions. These program instructions may be provided to a processor to produce a machine, such that the instructions which execute on the processor create means for implementing the functions specified in the flowchart and block diagram block or blocks. The computer program instructions may be executed by a processor to cause a series of operational steps to be performed by the processor to produce a computer implemented process such that the instructions which execute on the processor provide steps for implementing the functions specified in the flowchart and block diagram block or blocks.

Accordingly, blocks of the flowchart illustrations and the block diagrams support combinations of means for performing the specified functions, combinations of steps for performing the specified functions and program instruction means for performing the specified functions. It will also be understood that each block of the flowchart illustrations and block diagrams, and combinations of blocks in the flowchart illustrations and block diagrams, can be implemented by special purpose hardware-based systems which perform the specified functions or steps, or combinations of special purpose hardware and computer instructions. For example the receive transform circuit 174 and the transmit transform circuit 178 may be implemented as code executing on a processor, as integrated circuit devices, such as signal processors or custom chips, or as a combination of the above.

As described above, a form of channel coding is provided according to this invention that does not increase the number of transmitted bits, can be useful, herein called "rate one" coding. Such approaches may be particularly useful with source controlled decoding. In various implementations of "rate one" coding, each sequence of bits is uniquely mapped to a different sequence of bits of the same length by a rate one encoder. thus, the set of possible outputs from the decoder are identical to the set of possible inputs. For every possible output bit sequence, therefore, there is a possible output sequence differing by only one bit, called the adjacent sequence. However, the input sequences required to produce adjacent output sequences need no longer by adjacent, but may differ in several bit positions. thus, a hard decision error in receiving one transmitted bit would generally result in many decoded bit errors. If the information is such that it is discarded unless all bits are received error free, this error extension characteristic of rate one coding may be less useful. The error extension characteristic is most useful when practicing source-controlled decoding, in causing an erroneous sequence to be more easily recognized as an unlikely source signal.

While described above, without regard to source-controlled decoding, it shall be realized that rate one coding is most useful when a a-priori information source probabilities are also incorporated into the decoding metrics. This can be done, for example, by simply adding to each metric a constant which is precomputed for each decoder state and stored in a look-up table. The constant may represent the log-probability of that decoder state appearing in that particular position of the source coder output bitstream. These probabilities can be determined in advance for particular types of source codes, such as voice encoders or image encoders, and stored as log-likelihood values.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method for communicating encoded data comprising:
receiving L received encoded signal values including soft information and transforming the L received encoded signal values to L data symbols; and
demodulating the L received encoded signal values and decoding the demodulated L received encoded signal values using a rate one convolutional decoder having only one output symbol per input symbol to provide the L data symbols, wherein the L received encoded signal values are convolutional encoded using a rate one convolutional encoder having only one output symbol per input symbol and wherein the rate one convolutional decoder forms a maximum likelihood decoded result using a set of precomputed source-encoder log-likelihood values.

2. The method of claim 1 further comprising transforming the L received encoded signal values using associated spectral energy at a plurality of frequency ranges within a bandwidth of a channel over which the L received encoded signal values are received for at least one of the L received encoded signal values.

3. The method of claim 2 wherein the L received encoded signal values are orthogonal transform modulated and wherein transforming the L received encoded signal values using associated spectral energy at a plurality of frequency ranges within a bandwidth of a channel over which the L received encoded signal values are received for at least one of the L received encoded signal values further comprises orthogonal transform demodulating the L received encoded signal values to provide the L data symbols.

4. The method of claim 3 further comprising:
transforming L source symbols using an orthogonal transform to provide L transmit encoded signal values;
transmitting the L transmit encoded signal values over a channel subject to non-Gaussian noise; and
wherein receiving L received encoded signal values including soft information and transforming the L received encoded signal values to L data symbols further comprises receiving the L transmit encoded signal values over the channel as the L received encoded signal values and wherein the L data symbols are estimates of the L source symbols.

5. The method of claim 4 wherein the estimates of the L source symbols are compensated for time-varying fading imperfections on the channel.

6. The method of claim 4 wherein transforming L source symbols using an orthogonal transform to provide L transmit encoded signal values further comprises transforming L source symbols as a block using an orthogonal transform to provide L transmit encoded signal values and wherein receiving L received encoded signal values including soft information and transforming the L received encoded signal values to L data symbols further comprises receiving L received encoded signal values including soft information and transforming the L received encoded signal values as a block to L data symbols.

7. The method of claim 6 wherein the L source symbols are L source bits and the L data symbols are L data bits.

8. The method of claim 2 wherein the L received encoded signal values are one of Fourier transform or inverse Fourier transform modulated and then interleaved and wherein transforming the L received encoded signal values using associated spectral energy at a plurality of frequency ranges within a bandwidth of a channel over which the L received encoded signal values are received for at least one of the L received encoded signal values further comprises the other of Fourier transform or inverse Fourier transform demodulating and de-interleaving the L received encoded signal values to provide the L data symbols.

9. The method of claim 8 further comprising:
transforming L source symbols using the one of Fourier transform or inverse Fourier transform to provide L transmit encoded signal values;
interleaving the L transmit encoded signal values for transmission at non-sequential time intervals;
transmitting the L transmit encoded signal values over a channel subject to non-Gaussian noise; and
wherein receiving L received encoded signal values including soft information and transforming the L received encoded signal values to L data symbols further comprises receiving the L transmit encoded signal values over the channel as the L received encoded signal values and wherein the L data symbols are estimates of the L source symbols.

10. The method of claim 9 wherein transforming L source symbols using the one of Fourier transform or inverse Fourier transform to provide L transmit encoded signal values further comprises transforming L source symbols as a block using the one of Fourier transform or inverse Fourier transform to provide L transmit encoded signal values and wherein receiving L received encoded signal values including soft information and transforming the L received encoded signal values to L data symbols further comprises receiving L received encoded signal values including soft information and transforming the L received encoded signal values as a block to L data symbols.

11. The method of claim 10 wherein the L data symbols are complex symbols.

12. The method of claim 2 wherein the L received encoded signal values are Walsh transformed and wherein transforming the L received encoded signal values using associated spectral energy at a plurality of frequency ranges within a bandwidth of a channel over which the L received encoded signal values are received for at least one of the L received encoded signal values further comprises Walsh transforming the L received encoded signal values to provide the L data symbols.

13. The method of claim 12 wherein the L received encoded signal values are scrambled Walsh transformed and wherein transforming the L received encoded signal values using associated spectral energy at a plurality of frequency ranges within a bandwidth of a channel over which the L received encoded signal values are received for at least one of the L received encoded signal values further comprises scrambled Walsh transforming the L received encoded signal values to provide the L data symbols.

14. The method of claim 12 further comprising:
transforming L source symbols using a Walsh transform to provide L transmit encoded signal values;
transmitting the L transmit encoded signal values over a channel subject to non-Gaussian noise; and
wherein receiving L received encoded signal values including soft information and transforming the L received encoded signal values to L data symbols further comprises receiving the L transmit encoded signal values over the channel as the L received encoded signal values and wherein the L data symbols are estimates of the L source symbols.

15. The method of claim 14 wherein transforming L source symbols using a Walsh transform to provide L transmit encoded signal values further comprises transforming L source symbols as a block using a Walsh transform to provide L transmit encoded signal values and wherein receiving L received encoded signal values including soft information and transforming the L received encoded signal values to L data symbols further comprises receiving L received encoded signal values including soft information and transforming the L received encoded signal values as a block to L data symbols.

16. The method of claim 15 wherein the L data symbols are complex symbols.

17. The method of claim 1 wherein demodulating the L received encoded signal values and convolutional decoding the demodulated L received encoded signal values, further comprises convolutional decoding the demodulated L received encoded signal values as a block.

18. The method of claim 17 wherein the block is received as a tail biting block.

19. The method of claim 17 further comprising:
encoding L source symbols using the rate one convolutional encoder having only one output symbol per input symbol to provide L transmit encoded signal values;
transmitting the L transmit encoded signal values over a channel subject to non-Gaussian noise; and
wherein receiving L received encoded signal values including soft information and transforming the L received encoded signal values to L data symbols further comprises receiving the L transmit encoded signal values over the channel as the L received encoded signal values and wherein the L data symbols are estimates of the L source symbols.

20. The method of claim 19 wherein transmitting the L transmit encoded signal values over a channel subject to non-Gaussian noise is preceded by interleaving the L transmit encoded signal values for transmission at non-sequential time intervals and wherein receiving L received encoded signal values including soft information and transforming the L received encoded signal values to L data symbols further comprises de-interleaving the L received encoded signal values.

21. The method of claim 20 further comprising block coding the interleaved L transmit encoded signal values prior to transmission and wherein receiving L received encoded signal values including soft information and transforming the L received encoded signal values to L data symbols further comprises block decoding the L received encoded signal values.

22. The method of claim 21 wherein block coding the interleaved L transmit encoded signal values prior to transmission further comprises block coding the interleaved L transmit encoded signal values prior to transmission using at least one of a Reed-Solomon code, a Fire code, or a cyclical redundancy check and wherein block decoding the L received encoded signal values further comprises block decoding the L received encoded signal values using the at least one of a Reed-Solomon code, a Fire code, or a cyclical redundancy check.

23. A wireless receiver comprising:
a receiver configured to receive L received encoded signal values including soft information; and
means for demodulating the L received encoded signal values and decoding the demodulated L received encoded signal values using a rate one convolutional decoder having only one output symbol per input symbol to provide L data symbols, wherein the L received encoded signal values are convolutional encoded using a rate one convolutional encoder having only one output symbol per input symbol and wherein the rate one convolutional decoder is configured to provide a maximum likelihood result using precomputed log-likelihood values characteristic of an information source.

24. The wireless receiver of claim 23 further comprising:
a transmitter configured to transmit encoded signal values; and
a rate one encoder having only one output value per input symbol that provides encoded signal values to the transmitter.

25. A wireless receiver comprising:
a receiver configured to receive L received encoded signal values including soft information; and
a rate one convolutional decoder having only one output symbol per input value that demodulates the L received encoded signal values and decodes the demodulated L received encoded signal values using the soft information to provide the L data symbols, wherein the rate one convolutional decoder is configured to provide a maximum likelihood result based on pre-computed log-likelihood values characteristic of an information source encoder.

26. The wireless receiver of claim 25 wherein the rate one decoder demodulates the L received encoded signal values to output the soft information.

27. The wireless receiver of claim 25 further comprising a received signal strength determination circuit coupled to the receiver and the rate one decoder that outputs the soft information based on a measurement of the strength of respective ones of the L received encoded signal values.

28. The wireless receiver of claim 25 further comprising a de-interleaver that de-interleaves the L data symbols from the rate one decoder.

29. A rate one convolutional encoder/decoder for improving data transmission through channels having imperfections, comprising:
an encoding register that stores a last L data symbols, the encoding register being connected to a logic unit for forming only one transmit symbol for each new data symbol shifted into the encoding register;
a receiver that receives transmitted symbols and compares them with a corresponding symbol locally generated by a copy of the contents of an encoding register of a transmitter that generated the transmitted symbols and a hypothesis of a last L data symbols from the transmitter to produce mismatch metrics, wherein the mismatch metrics are biased using precomputed log-likelihood values characteristic of an information source encoding; and
a Viterbi processor that accumulates the mismatch metrics and determines a sequence of successive symbol hypotheses that produces a lowest cumulative metric, thereby decoding the received transmitted symbols.

30. The encoder/decoder of claim 29 in which said data symbols and said transmitted symbols are binary bits.

31. The encoder/decoder of claim 29 in which said data symbols belong to a first alphabet containing a first number of possible values and said transmitted symbols belong to a second alphabet containing a larger number of possible values than said first number of values and further comprising an interleaver that places successive ones of said transmitted symbols formed by said logic unit in non-successive time-positions in a transmitted stream and a de-interleaver for recollecting non-successively transmitted symbols from the transmitter at the receiver for successive processing by the Viterbi processor.

32. The encoder/decoder of claim 29 configured to encode, transmit, receive and decode blocks of data symbols at a time.

33. The encoder/decoder of claim 32 wherein the blocks are tailbiting blocks.

34. The encoder/decoder of claim 32 wherein the blocks further include known tail bits and the encoder produces only one encoded bit per data bit and only one encoded bit per tail bit.

* * * * *